United States Patent [19]

Young

[11] 4,121,768

[45] Oct. 24, 1978

[54] ATTACHMENT FOR A NOZZLE CENTERBODY

[75] Inventor: John H. Young, South Windsor, Conn.

[73] Assignee: United Technologies Corporation, Hartford, Conn.

[21] Appl. No.: 791,351

[22] Filed: Apr. 27, 1977

[51] Int. Cl.² .............................................. F16B 5/04
[52] U.S. Cl. .............................. 239/127.3; 239/397.5
[58] Field of Search ............... 239/127.1, 127.3, 397.5; 403/28, 30, 179

[56] References Cited

U.S. PATENT DOCUMENTS

| 699,578 | 5/1902 | Rush | 239/397.5 |
| 2,955,415 | 10/1960 | Long | 239/397.5 |
| 3,972,475 | 8/1976 | Nelson et al. | 239/127.3 |

*Primary Examiner*—Robert W. Saifer
*Attorney, Agent, or Firm*—Norman Friedland

[57] ABSTRACT

The fore end (nose) of the centerbody of a two-dimensional nozzle located in the direct path of the exhaust from the tail pipe or afterburner of a jet engine includes an aerodynamic shaped sheath and slip joint means are disclosed which serve to support the sheath to a structural member such that the thermal stress problems at the attachment points occasioned by the hostile environment are obviated and means for cooling the joint are also disclosed.

8 Claims, 2 Drawing Figures

ATTACHMENT FOR A NOZZLE CENTERBODY

BACKGROUND OF THE INVENTION

This invention relates to a plug subjected to high thermal stresses and particularly to means for supporting the outer sheath thereof.

As is well known the centerbody of a two-dimensional nozzle for a turbine type power plant is subjected to high temperature discharging from the tail pipe or afterburner. In order for the components to function reliably and endure in such a hostile environment it has been necessary to cool these components. One method of cooling is to introduce cooler air internally of the centerbody and direct it to impinge on the panels and the air picking up the heat is discharged into the airstream exhausting from the tail pipe. Obviously the temperature differential across the panels owing to the temperature of the environment acting on the outer wall or shell of the centerbody and the cooling air acting internally thereof can exceed 1000° F, thus introducing large thermal stresses particularly on the fasteners.

This invention serves to withstand these high thermal stresses for preventing buckling and distortions of the nose by providing a slip joint attachment which allows for thermal growth of the flexible sheath. A collar surrounding the rivet which attaches the hot shield to the relative cool inner sheet carries an annular upstanding flange which frictionally accommodates the cooler inner sheet. The judicious spacing of the collar permits thermal growth and the annular groove formed by the upstanding flange provides a cooling path for minimizing localized hot spots.

SUMMARY OF THE INVENTION

An object of this invention is to provide for a centerbody of a turbine engine power plant two dimensional nozzle an improved construction of the impingement cooled nose panel.

A still further object of this invention is to provide improved attachment means for the impinged cooled skin of a member subjected to a hostile environment imposing high thermal stresses. A feature of the invention is to provide discretely shaped collars surrounding the attachment rivet securing the outer shield to the inner cooler sheet, providing a frictional slip joint which permits thermal growth and defining a cooling flow path for impingement cooling of the hot sheet adjacent the rivet.

Other features and advantages will be apparent from the specification and claims and from the accompanying drawings which illustrate an embodiment of the invention.

DESCRIPTION OF THE PREFERRED EMBODIMENT

A two dimensional nozzle and panel construction of the type contemplated by this invention is disclosed in patent application Ser. No. 751,802 filed on Dec. 16, 1976 by R. B. Cavanagh, Jr. and D. K. Jan and assigned to the same assignee and now abandoned and for further details thereof reference should be made thereto. However, as will be appreciated by one skilled in this art, although this invention is utilized for attaching the panels of the nose of the centerbody, such attachment means have utility in other applications where thermal stresses may be a major consideration.

Figure 1:
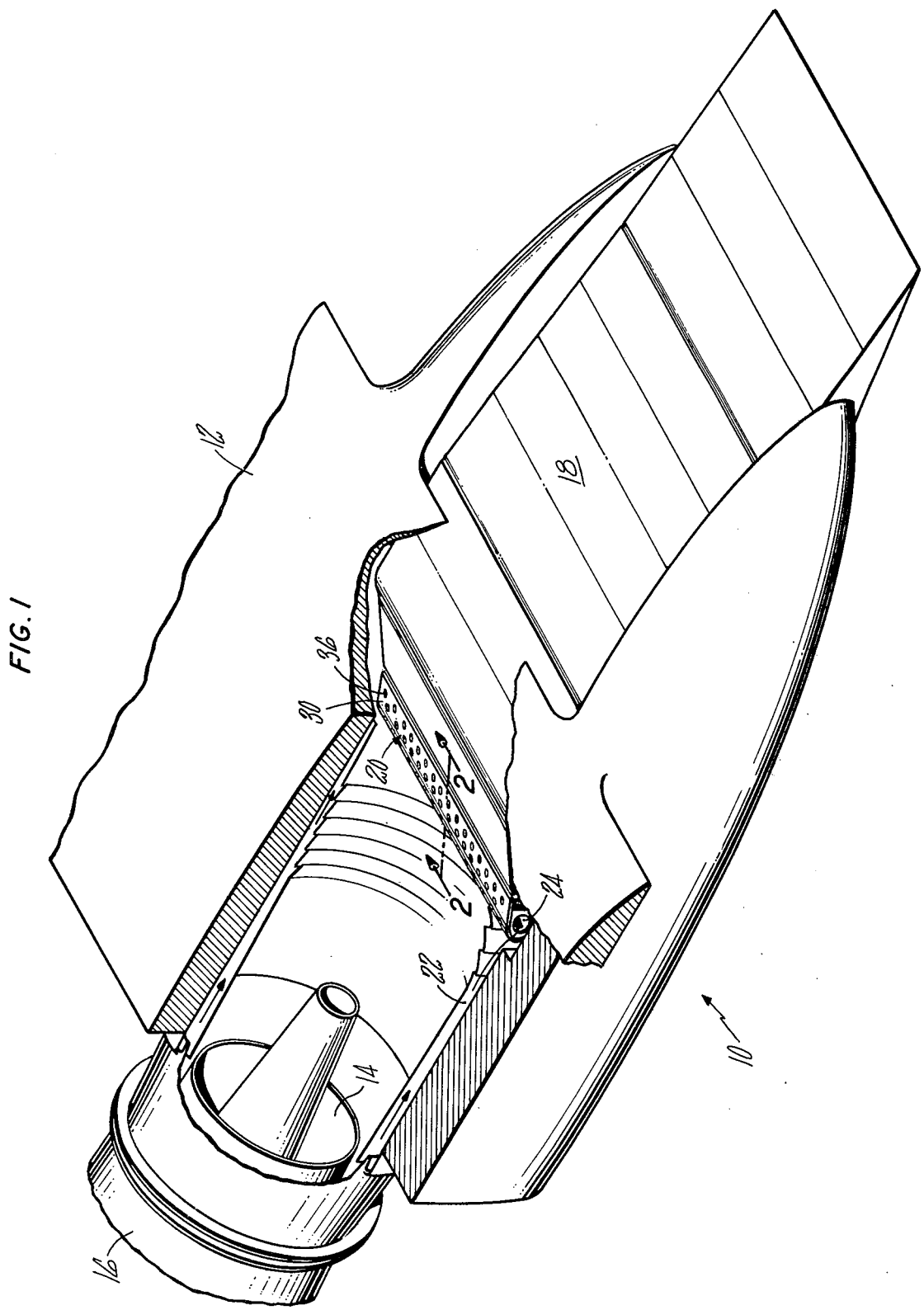
FIG. 1 is a breakaway fragmental perspective view showing the centerbody of a two dimensional nozzle mounted in an aircraft adjacent the engine tail pipe.

Referencing FIG. 1 there is shown the two dimensional nozzle generally illustrated by referencing numeral 10 which may be made integral with the aircraft structure 12 (only a portion thereof being shown) and communicates with the exhaust 14 of a jet engine 16 (only a part thereof being shown).

The centerbody 18 comprises articulating panels and the nose 20. Because the invention is only concerned with the construction of nose 20 a detailed description of the other components are omitted herefrom for the sake of simplicity and clarity. Suffice it to say that a portion of the hot gases emanating from the jet engine impinge on the outer skin of nose 20, and splits for flowing over and under the centerbody. Cooling air supplied from a source, say upstream of the engine and perhaps, fan discharge air if engine is a fan jet, and is conducted via annular passage 22 and admitted internally of nose 20 via opening 24, (as illustrated by the arrows).

The temperature of the cooling air may be, say 300° while the temperature of the hot engine gases may be 1500°. Obviously, the high temperature differential makes it undesirable that high thermal stresses are a critical problem.

Figure 2:
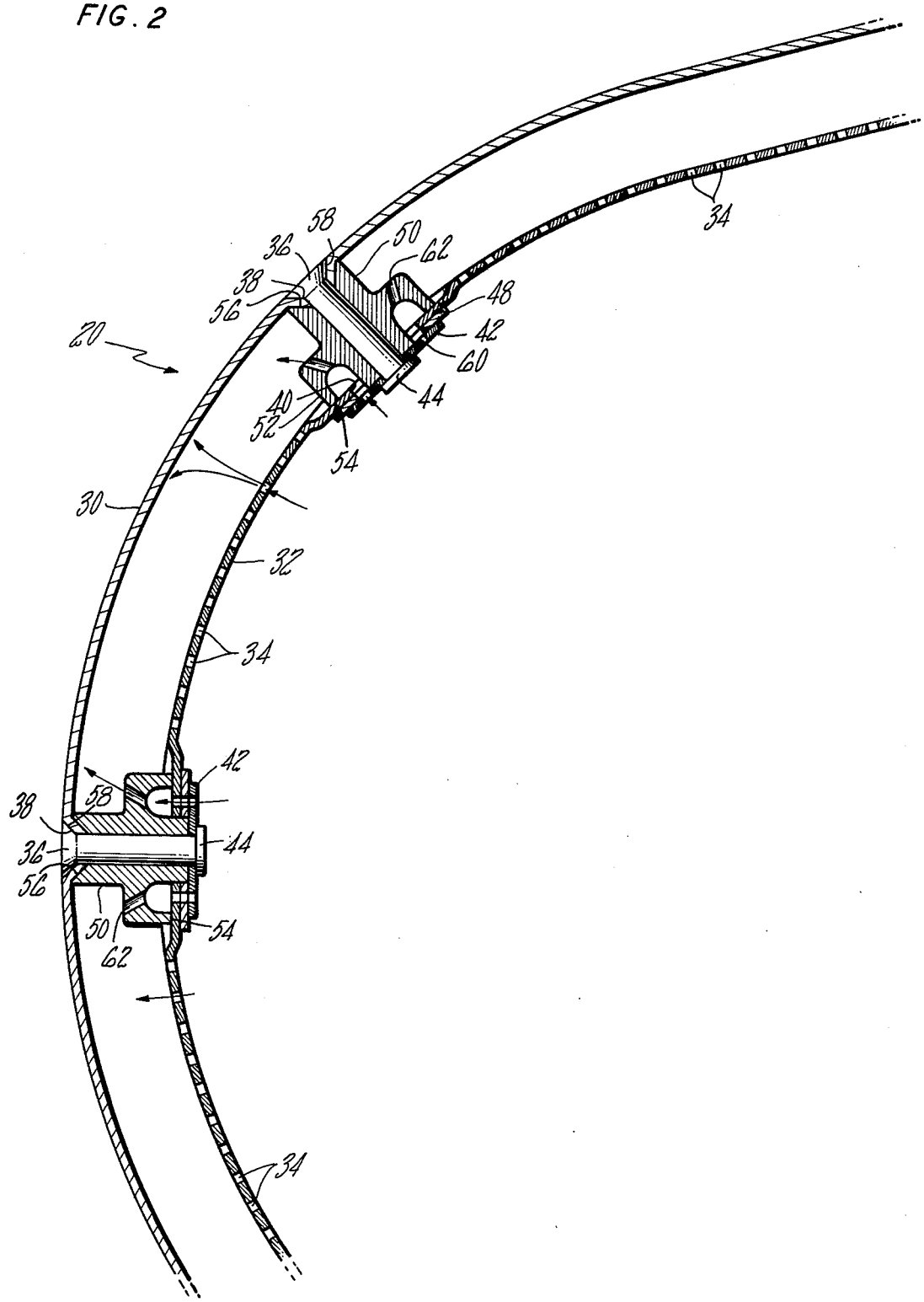
FIG. 2 is a sectional view taken along lines 2—2 of FIG. 1 showing the details of the invention.

As can be seen from FIG. 2 the nose 20 is constructed by two spaced apart sheet metal bullets shaped members, the heat shield 30 and the sheet 32. A plurality of apertures 34 in cold sheet 32 serves to direct the cool air internally of nose 20 to impinge on the inside surface of heat shield 30. Cold heat 32 is secured to a bulkhead (not shown) and is held rigid. The hot shield 30 is, in turn, secured to cold sheet 32 in the manner described hereinbelow.

According to this invention a flush rivet 36 extends through opening 38 formed in hot shield 30 and opening 40 formed in cold sheet 32. Washer 42 shoulders against head 44 of rivet 36 and bears against the periphery of opening 40. A wear disc 48 may be attached to the cold sheet 32, as shown. Collar 50 surrounding the shank of rivet 36 carries an annular upstanding flange 52 having a bearing surface 54 bearing against the inner surface of cold sheet 32. The beveled face 56 of collar 50 and the beveled face 58 of rivet 36 sandwich the heat shield 30 adjacent aperture 38. As is apparent from the foregoing attaching the rivet in the usual manner serves to squeeze the cold sheet 32 between washer 42 and bearing surface 54 thereby forming a frictional fit. This slip joint allows the hot sheet to grow thermally the distance represented by the gap between the periphery of opening 40 of cold sheet 32 and the outer diameter of collar 50.

Identical attachments means are located about the skin of nose 20 so that as the growth of the sheet radiates, the fasteners permit thermal growth without incurring bending and distortions. It is contemplated in the scope of this invention that the shape of the slots in the cold sheet and their locations are dictated by the particular pattern of thermal growth occasioned by the particular application. The criteria to obtain the size and location would be predicated on actual testing. At least one of the fasteners located at a mid-point is sized so that the cold sheet abuts against the collar 50. This serves to orient the skin and hold it from being mispositioned.

Apertures 60 and 62 in washer 42 and collar 50 respectively serve to direct cooling air externally of nose 20 to impinge against hot shield 30 in proximity to the rivet. This serves to prevent localized hot spots adjacent the fasteners.

What has been shown by the invention is a relatively simple means that solves the thermal stress problems occasioned a hostile environment by allowing the relatively cooler sheet of a bullet shaped plug to grow radially with respect to the attachment means. The means for providing the slip joint not only allows the thermal growth but permits impingement cooling at a point where stresses are at a maximum, thereby minimizing the adverse effect of thermal stress.

It should be understood that the invention is not limited to the particular embodiments shown and described herein, but that various changes and modifications may be made without departing from the spirit or scope of this novel concept as defined by the following claims.

I claim:

1. Means for constructing a wall subjected to high temperature differentials comprising an outer sheath subjected to a high temperature environment, an inner spaced sheath coextensive with the outer sheath and having a plurality of apertures for directing a cooling medium to impinge on the inner surface of said outer sheath, said means including an attachment means extending through aligned openings formed on the inner sheath and the outer sheath, a flat plate-like member shouldered between said attachment means and the inner sheath, a collar surrounding said attachment means and extending between said flat plate-like member and the outer sheath, bearing means carried by said collar bearing against the inner surface of said inner sheath and the diameter opening of said inner sheath being sufficiently larger than the diameter of said collar defining a space to allow thermal growth of said outer sheath to minimize thermal stresses and the force exerted by said bearing means against said inner sheath allowing relative movement therebetween.

2. Means as in claim 1 wherein said attachment means includes a rivet.

3. Means as in claim 1 wherein said bearing means includes an annular flange coaxial flange about said collar and spaced therefrom defining an annular space, the periphery of said inner sheath adjacent said opening therein extending in said annular space.

4. Means as in claim 3 including means for cooling said outer sheath adjacent said attachment means, said cooling including openings formed in said flange for directing said cooling medium to impinge in proximity of said fastening means.

5. Means for constructing the nose of a centerbody of a two-dimensional nozzle subjected to high temperature exhaust from a turbine type power plant comprising a relatively thin wall hot shield, a relatively thin wall cold sheet coextensive with and spaced from said hot shield and having a plurality of apertures for directing a cool air to impinge on the inner surface of said hot shield, attachment means including a rivet extending through aligned openings formed on the cold sheet and the hot shield, a washer shouldered between the head of said rivet and the cold sheet, a collar surrounding said rivet and extending between said washer and the hot shield, bearing means carried by said collar bearing against the inner surface of said cold sheet defining a slip joint and the diameter of said opening of said cold sheet being sufficiently larger than the diameter of said collar providing sufficient thermal growth of said hot shield to minimize thermal stresses and the force exerted by said bearing means allowing relative movement between it and said cold sheath.

6. Means as in claim 5 wherein said nose comprises a plurality of said attachment means located in an array to match the heat load radiating from the center of said nose and the shape of said openings being selected to allow for the thermal growth in accordance with said radiated heat load.

7. Means as in claim 6 wherein the diameter of the openings of said cold sheet adjacent said fastening means at the center of said nose is substantially equal to the diameter of said collar means permitting relatively no movement therebetween.

8. Means as in claim 5 including a washer shaped wear plate interposed between said washer and the outer face of said cold sheet.

UNITED STATES PATENT AND TRADEMARK OFFICE
CERTIFICATE OF CORRECTION

PATENT NO. : 4,121,768
DATED : October 24, 1978
INVENTOR(S) : John H. YOung

It is certified that error appears in the above-identified patent and that said Letters Patent are hereby corrected as shown below:

(1) Column 1, insert the following paragraph before the "BACKGROUND OF THE INVENTION":

--The Government has rights in this invention pursuant to Contract No. N00140-73-C-0027 awarded by the Department of the Navy.--

(2) Column 2, line 37, "Cold heat 32" should read --Cold sheet 32--

(3) Column 3, line 38, after "diameter" insert --of said--

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*